United States Patent
Kabutz

(10) Patent No.: US 7,345,978 B2
(45) Date of Patent: Mar. 18, 2008

(54) METHOD FOR IN-SECTOR DATA MANAGEMENT IN FRAME ADDRESSING

(75) Inventor: Marten Kabutz, Villingen-Schwenningen (DE)

(73) Assignee: Thomson Licensing, Boulogne Billancourt (FR)

(*) Notice: Subject to any disclaimer, the term of this patent is extended or adjusted under 35 U.S.C. 154(b) by 613 days.

(21) Appl. No.: 10/405,552

(22) Filed: Apr. 2, 2003

(65) Prior Publication Data

US 2003/0214894 A1 Nov. 20, 2003

(30) Foreign Application Priority Data

Apr. 5, 2002 (EP) .................................. 02007715

(51) Int. Cl.
*G11B 7/005* (2006.01)
(52) U.S. Cl. .................................. 369/59.25
(58) Field of Classification Search .................. None
See application file for complete search history.

(56) References Cited

U.S. PATENT DOCUMENTS

| | | | |
|---|---|---|---|
| 6,041,029 A | 3/2000 | Iida et al. | 369/50 |
| 6,130,866 A * | 10/2000 | Shigenobu et al. | 369/47.18 |
| 6,191,903 B1 * | 2/2001 | Fujimoto et al. | 369/59.26 |
| 6,236,631 B1 * | 5/2001 | Deguchi et al. | 369/53.34 |
| 2002/0110071 A1 * | 8/2002 | Oki et al. | 369/59.24 |

FOREIGN PATENT DOCUMENTS

| | | |
|---|---|---|
| EP | 0820062 A | 1/1998 |
| EP | 0820063 A | 1/1998 |
| JP | 07307731 A * | 11/1995 |

OTHER PUBLICATIONS

Machine translation and English abstract of JP 07307731 A.*
European Search Report, The Hague, Oct. 15, 2002.

* cited by examiner

*Primary Examiner*—William Korzuch
*Assistant Examiner*—Nathan Danielsen
(74) *Attorney, Agent, or Firm*—Joseph J. Laks; Robert B. Levy

(57) ABSTRACT

A method for determining the address of a frame inside a data sector of an optical recording medium (17), the sector comprising a plurality of frames, each frame being preceded by a synchronization code, and an apparatus (10) for reading from and/or writing to optical recording media (17) using such method.

A method for determining the address of a frame inside a data sector of an optical recording medium (17) that is robust against streaming loss is proposed. The method comprises the steps of:

keeping a history of previously detected synchronization codes;
appending (2) the detected synchronization code to the history;
comparing (3) a pattern of the last synchronisation codes with a plurality of valid patterns of synchronization codes;
delivering (4) a valid frame address if the pattern corresponds to a valid pattern, the frame address corresponding to the valid pattern, and
delivering (7) an error frame address if the pattern does not correspond to a valid pattern.

11 Claims, 1 Drawing Sheet

METHOD FOR IN-SECTOR DATA MANAGEMENT IN FRAME ADDRESSING

FIELD OF THE INVENTION

The present invention relates to a method for determining the address of a frame inside a data sector of an optical recording medium, the sector comprising a plurality of frames, each frame being preceded by a synchronization code, and an apparatus for reading from and/or writing to optical recording media using such method.

BACKGROUND OF THE INVENTION

Data stored on optical recording media like DVD (digital video or versatile disk) or SACD (super audio compact disk) consists of a plurality of physical sectors. Each sector consists of 26 frames of a length of 91 data bytes each. Every frame is preceded by one of eight types of synchronisation codes SY0 . . . SY7 that do not occur in the 16/8 modulation used for encoding the data on the recording medium. These synchronization codes are located in the sector in the following pattern:

| row# 0  | SY0 | frame# 0  | SY5 | frame# 1  |
|---------|-----|-----------|-----|-----------|
| row# 1  | SY1 | frame# 2  | SY5 | frame# 3  |
| row# 2  | SY2 | frame# 4  | SY5 | frame# 5  |
| row# 3  | SY3 | frame# 6  | SY5 | frame# 7  |
| row# 4  | SY4 | frame# 8  | SY5 | frame# 9  |
| row# 5  | SY1 | frame# 10 | SY6 | frame# 11 |
| row# 6  | SY2 | frame# 12 | SY6 | frame# 13 |
| row# 7  | SY3 | frame# 14 | SY6 | frame# 15 |
| row# 8  | SY4 | frame# 16 | SY6 | frame# 17 |
| row# 9  | SY1 | frame# 18 | SY7 | frame# 19 |
| row# 10 | SY2 | frame# 20 | SY7 | frame# 21 |
| row# 11 | SY3 | frame# 22 | SY7 | frame# 23 |
| row# 12 | SY4 | frame# 24 | SY7 | frame# 25 |

The sequence of syncs through a sector is thus:
0 5 1 5 2 5 3 5 4 5 1 6 2 6 3 6 4 6 1 7 2 7 3 7 4 7

Due to the special arrangement of the synchronization codes, decoders for decoding the data stored on the recording medium can easily synchronize their timing or re-synchronise after clock loss During playback of optical recording media, different kinds of defects can occur, causing problems to the phase-locked loop (PLL) based acquisition system. If a defect occurs which can be detected by a disturbance detector (e.g. a black dot or a silver dot), the PLL is frozen and the correct number of frames is inserted. If, however, the defect cannot be detected by the disturbance detector (e.g. an interruption), the PLL can drift away and an incorrect number of frames is inserted. This problem is inherent to a PLL-based acquisition system and causes streaming loss until the start of the next sector. The same happens when a synchronisation code is inserted or a wrong synchronisation code is detected.

SUMMARY OF THE INVENTION

An object of the present invention is, therefore, to propose a method for determining the address of a frame inside a data sector of an optical recording medium that is robust against streaming loss. It is another object of the present invention to propose an apparatus for reading from and/or writing to optical recording media using such method.

According to the invention, a method for determining the address of a frame inside a data sector of an optical recording medium, the sector comprising a plurality of frames, each frame being preceded by a synchronization code which is detected during playback of the optical recording medium, comprises the steps of:

keeping a history of previously detected synchronization codes;

appending the detected synchronization code to the history;

comparing a pattern of the last synchronisation codes with a plurality of valid patterns of synchronization codes;

delivering a valid frame address if the pattern corresponds to a valid pattern, the frame address corresponding to the valid pattern, and delivering an error frame address if the pattern does not correspond to a valid pattern.

When a synchronization code is detected during playback, the corresponding 3-bit sync number 0 . . . 7 is appended to the history of previously detected synchronisation codes. The pattern of the last synchronisation codes is then compared with a plurality of valid patterns, i.e. patterns corresponding to the different frame addresses. If the comparison gives a valid pattern, the corresponding frame address is found and outputted. If a synchronisation code is inserted or an unexpected synchronisation code is used, the pattern of the last synchronisation codes will not correspond to a valid pattern. An error frame address will then be delivered. As soon as the next valid pattern of the last synchronisation codes is found, the next valid frame address is delivered, i.e. streaming loss is recovered still within the sector.

Advantageously, the history of previously detected synchronisation codes, the pattern of the last synchronisation codes and the valid patterns of synchronization codes each comprise four synchronisation codes. In this way the valid frame address is found with high security while at the same time the effort necessary for the comparison of the patterns is kept low. Of course, it is also possible to use less than four or more than four synchronisation codes for comparison of the patterns. However, with less synchronisation codes the security is reduced, while with more synchronisation codes the effort for comparison of the patterns increases.

Favourably, the method according to the invention further comprises the steps of:

resetting the synchronisation codes kept in the history to zero if the pattern of the last synchronisation codes does not correspond to a valid pattern;

enabling a reset protection for the history after resetting; and disabling the reset protection the next time the pattern of the last synchronisation codes corresponds to a valid pattern.

Resetting the history of synchronisation codes to zero prevents that two successive wrong synchronisation codes are kept in the history. Otherwise in combination these wrong synchronisation codes could give a valid pattern and thus a bad frame address. Enabling the reset protection prevents more resets before the next valid pattern of synchronisation codes has been detected. Without the reset protection after the first reset no more valid patterns could be detected.

According to the invention, the history of previously detected synchronisation codes is kept in a shift register. In this way only a small number of previously detected synchronisation codes has to be stored. When a synchronisation code is detected, it is placed in the first slot of the shift register, pushing all previous synchronisation codes by one slot.

Advantageously, the valid patterns of synchronisation codes are stored in a table. This allows for fast comparison of the pattern of the last synchronisation codes with the valid patterns.

According to the invention, the error frame address is one of a plurality of predefined frame addresses depending on the last valid frame address. Advantageously, two predefined frame addresses are used, both lying outside the range of valid frame addresses. By using the two frame addresses alternatingly, correct row addressing is achieved. For that purpose the row number is obtained from the four most significant bits of the previous valid or error frame address and a signal indicating the next row is obtained from the inverted least significant bit of the previous valid or error frame address.

According to another aspect of the invention, a device for determining the address of a frame inside a data sector of an optical recording medium, the sector comprising a plurality of frames, each frame being preceded by a synchronisation code which is detected during playback of the optical recording medium, comprises means for keeping a history of previously detected synchronisation codes, means for appending the detected synchronisation code to the history, a comparator for comparing a pattern of the last synchronisation codes with valid patterns of synchronisation codes, the valid patterns corresponding to the different frame addresses, and an output for delivering a frame address of the current frame.

Such a device has the advantage that it allows recovery of streaming loss still within the sector where the streaming loss occurred. Streaming loss is recovered quickly and with a high degree of certainty.

Advantageously, the delivered frame address is a valid frame address if the pattern of the last synchronisation codes corresponds to a valid pattern, and an error frame address otherwise. This allows for a secure discrimination between valid and invalid frame addresses.

Favourably, the means for keeping the history of previously detected synchronisation codes is a shift register. This has the advantage that only a small number of synchronisation codes has to be stored, making storage inexpensive.

According to the invention, the error frame address is one of a plurality of predefined frame addresses depending on the last valid frame address. If two predefined frame addresses are used alternatingly, both frame addresses lying outside the range of valid frame addresses, correct row addressing is achieved. For that purpose the row number is obtained from the four most significant bits of the previous valid or error frame address and a signal indicating the next row is obtained from the inverted least significant bit of the previous valid or error frame address.

Favourably, the device further comprises a table for storing the valid patterns of synchronization codes. This allows a fast comparison of the pattern of the last synchronisation codes with the valid patterns.

According to another aspect of the invention, an apparatus for reading from and/or writing to optical recording media uses a method or comprises a device according to the invention for frame addressing. Such an apparatus is capable of recovering streaming loss still within the sector where a streaming loss occurred. Therefore, during playback data which has been read correctly is not written to a wrong position. This is beneficent for decoding, since it gives the error correction more capacity to correct other errors, resulting in an overall improved performance.

BRIEF DESCRIPTION OF THE DRAWINGS

An exemplary embodiment of the invention is specified in the following description of an advantageous method with reference to the figures. It is understood that the invention is not limited to this exemplary embodiment and that the specified features can also expediently be combined and/or modified without departing from the scope of the present invention. In the figures.

DETAILED DESCRIPTION OF PREFERED EMBODIMENTS

Figure 1:
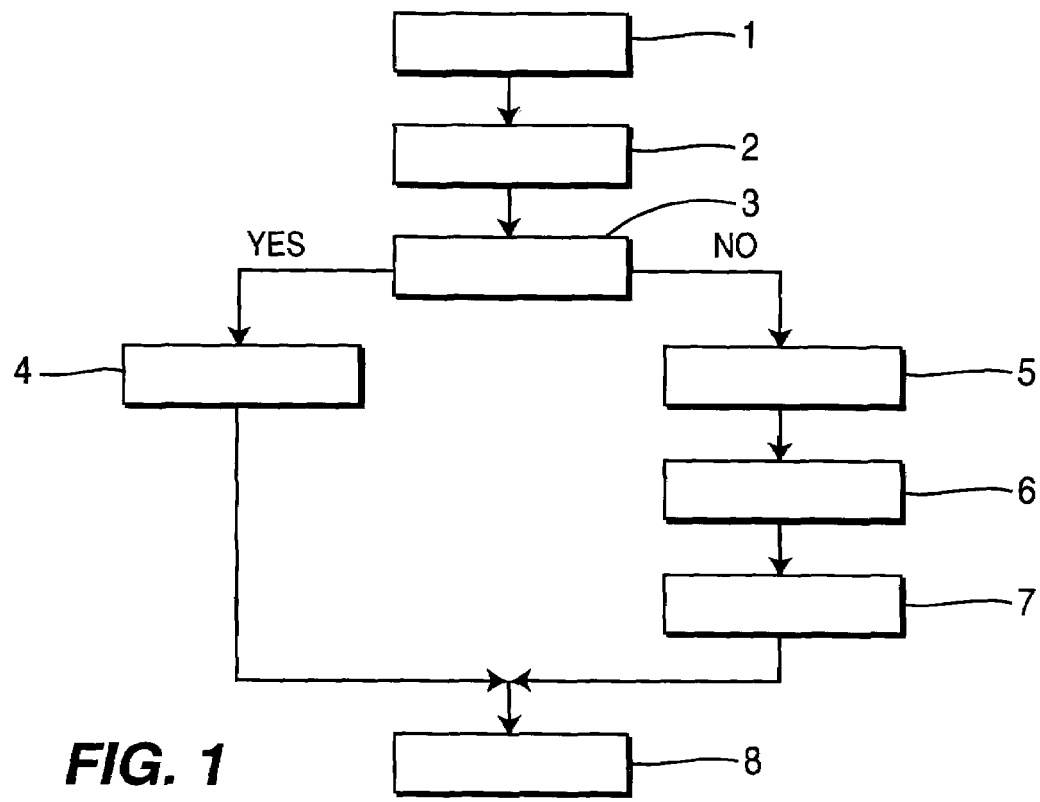
FIG. 1 shows a flowchart of method according to the invention.

FIG. 1 schematically shows a flowchart of a method according to the invention. When data is played back from an optical recording medium 17, in a step 1 a synchronization code is detected. If the synchronisation code is used, the corresponding sync number is pushed in a step 2 into a four-step shift register. In a step 3 the pattern of the four sync numbers stored in the shift register is compared with valid patterns of sync numbers. If the pattern is a valid pattern, in a step 4 the corresponding frame address is found. This frame address is then output in a step 8. If, on the other hand, the pattern stored in the shift register does not correspond to a valid pattern, in a step 5 the values in the shift register are reset to zero. To prevent further resets until the next valid pattern of synchronisation codes is found, in a step 6 a reset protection is enabled. Then one of two possible error frame address is determined depending on the last valid frame address. This error frame address is outputted in the step 8. The frame address output will thus provide a continuous zero to 25-frame address for correct data. If a defect occurs which can be detected by a disturbance detector (e.g. a black dot or a silver dot), the PLL is frozen and the correct number of frames is inserted. If a defect occurs which cannot be detected by the disturbance detector (e.g. an interruption), the PLL can drift away and a wrong number of frames can be inserted during the defect. The first valid frame address will then re-synchronise the frame addressing. For better understanding an example is shown below, using 30 and 31 as error frame addresses:

| 'real' frame | frame address | shift register | | | |
|---|---|---|---|---|---|
| | | SY [3] | SY [2] | SY [1] | SY [0] |
| 11 | 11 | 4 | 5 | 1 | 6 |
| 12 | 12 | 5 | 1 | 6 | 2 |
| 13 defective | 31 | 0 | 0 | 0 | 0 |
| 14 | 30 | 0 | 0 | 0 | 3 |
| 15 | 31 | 0 | 0 | 3 | 6 |
| 16 | 30 | 0 | 3 | 6 | 4 |
| 17 | 17 | 3 | 6 | 4 | 6 |
| 18 | 18 | 6 | 4 | 6 | 1 |

To achieve row addressing the row number is obtained from the four most significant bits of the frame address and a signal indicating the next row is obtained from the inverted least significant bit of the frame address. The derivation of row addressing is shown below using the above example:

| 'real' frame | frame address | SY[3] | SY[2] | SY[1] | SY[0] | next row | row |
|---|---|---|---|---|---|---|---|
| 11 | 11 | 4 | 5 | 1 | 6 | 0 | |
| 12 | 12 | 5 | 1 | 6 | 2 | 1 | 6 |
| 13 defective | 31 | 0 | 0 | 0 | 0 | 0 | |
| 14 | 30 | 0 | 0 | 0 | 3 | 1 | 15 |
| 15 | 31 | 0 | 0 | 3 | 6 | 0 | |
| 16 | 30 | 0 | 3 | 6 | 4 | 1 | 15 |
| 17 | 17 | 3 | 6 | 4 | 6 | 0 | |
| 18 | 18 | 6 | 4 | 6 | 1 | 1 | 9 |

Figure 2:
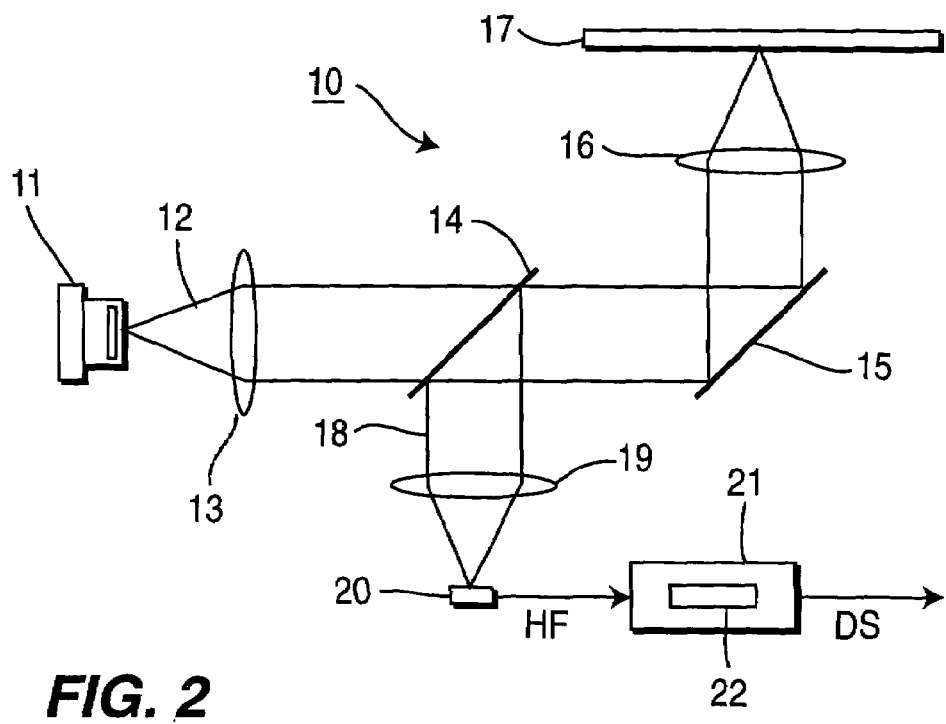
FIG. 2 shows an apparatus for reading from and/or writing to optical recording media comprising a device according to the invention.

FIG. 2 schematically depicts an apparatus 10 for reading from and/or writing to optical recording media 17 comprising a device 22 according to the invention. A laser diode 11 emits a light beam 12, which is collimated by a collimating lens 13. The collimated light beam 12 passes a semi-transparent mirror 14 and is directed by a mirror 15 to a focussing lens 16, which focuses the light beam 12 onto the track of an optical recording medium 17. The optical recording medium 17 reflects part of the light, which is modulated according to the information stored in the track of the optical recording medium 17. The reflected light is collimated by the focusing lens 16 and directed by the mirror 15 to the semi-transparent mirror 14. The semi-transparent mirror 14 deflects part of the returning light beam 18 to a further focusing lens 19, which focuses the returning light beam 18 on a photodetector 20. The photodetector 20 allows to detect the modulation contained in the returning light beam 18 and, therefore, to recover the information stored in the track of the optical recording medium 17, which is output as a data signal HF. The photodetector 20 may comprise a plurality of detector elements to generate tracking and focusing error signals used for tracking and focusing besides the data signal HF. The data signal HF is input into a data acquisition system 21 comprising a device 22 according to the invention. The data acquisition system 21 outputs a data stream DS. For that purpose, the data acquisition system 21 performs frame insertion if defects are detected. In addition, if streaming loss occurs due to non-detectable defects, recovery of the streaming loss is achieved using the device 22.

What is claimed is:

1. A method for determining the address of a frame inside a data sector of an optical recording medium, the data sector comprising a plurality of frames, each frame being preceded by a synchronisation code which is detected during playback of the optical recording medium, the method comprising the steps of:
   keeping a history of previously detected synchronisation codes;
   appending the detected synchronisation code to the history;
   each time a synchronisation code is appended to the history, comparing a pattern of previously detected synchronisation codes with a plurality of valid patterns of synchronisation codes;
   delivering a valid frame address if the pattern of previously detected synchronisation codes corresponds to one of the plurality of valid patterns of synchronisation codes the valid frame address corresponding to the valid pattern of synchronisation codes; and
   delivering an error frame address if the pattern of previously detected synchronisation codes does not correspond to any of the plurality of valid patterns of synchronisation codes,
   wherein the error frame address is one of a plurality of predefined frame addresses different from any valid frame address in the data sector depending on a last delivered valid frame address.

2. A method according to claim 1, further comprising the steps of:
   resetting the history to zero if the pattern of previously detected synchronisation codes does not correspond to any of the plurality of valid patterns of synchronisation codes;
   enabling a reset protection for the history after resetting; and
   disabling the reset protection the next time the pattern of previously detected synchronisation codes corresponds to one of the plurality of valid patterns of synchronisation codes.

3. A method according to claim 1, wherein the history of previously detected synchronisation codes is kept in a shift register.

4. A method according to claim 1, wherein the plurality of valid patterns; of synchronisation codes are stored in a table.

5. A method according to claim 1, wherein the history of previously detected synchronisation codes, the pattern of previously detected synchronisation codes and the valid patterns of synchronisation codes each comprise four synchronisation codes.

6. An apparatus for reading from and/or writing to optical recording media comprising:
   means for reading from and/or writing to said optical recording media; and
   means for performing the method according to claim 1.

7. A device for determining the address of a frame inside a data sector of an optical recording medium, the data sector comprising a plurality of frames, each frame being preceded by a synchronisation code which is detected during playback of the optical recording medium, characterized in that the device comprises means for keeping a history of previously detected synchronisation codes, means for appending the detected synchronisation code to the history, a comparator for comparing a pattern of previously detected synchronisation codes with valid patterns of synchronisation codes each time a synchronisation code is appended to the history, the valid patterns of synchronisation codes corresponding to valid frame address; and an output for delivering a frame address of the current frame,
wherein the delivered frame address is one of the valid frame addresses if the pattern of previously detected synchronisation codes corresponds to one of the valid patterns of synchronisation codes, and an error frame address otherwise, the error frame address being one of a plurality of predefined frame addresses different from the valid frame addresses and depending on a last delivered valid frame address.

8. A device according to claim 7, wherein the means for keeping the history of previously detected synchronisation codes is a shift register.

9. A device according to claim 7, further comprising a table for storing the valid patterns of synchronisation codes.

10. A device according to claim 7, wherein the history of previously detected synchronisation codes, the pattern of previously detected synchronisation codes and the valid patterns of synchronisation codes each comprise four synchronisation codes.

11. An apparatus for reading from and/or writing to optical recording media, wherein it comprises a device according to claim 7 for frame addressing.

* * * * *